(12) United States Patent
Silvera et al.

(10) Patent No.: US 8,086,482 B2
(45) Date of Patent: Dec. 27, 2011

(54) PERFORMANCE OPTIMIZATION

(75) Inventors: Timothy Silvera, Elizabeth, CO (US); Trevor Norcross, Denver, CO (US); Eric Buhring, Parker, CO (US); Keith Pelletier, Parker, CO (US)

(73) Assignee: Teletech Holdings, Inc., Englewood, CO (US)

( * ) Notice: Subject to any disclaimer, the term of this patent is extended or adjusted under 35 U.S.C. 154(b) by 1112 days.

(21) Appl. No.: 11/627,687

(22) Filed: Jan. 26, 2007
(Under 37 CFR 1.47)

(65) Prior Publication Data
US 2008/0040206 A1    Feb. 14, 2008

Related U.S. Application Data

(60) Provisional application No. 60/763,070, filed on Jan. 27, 2006.

(51) Int. Cl.
*G06Q 10/00*    (2006.01)
(52) U.S. Cl. ........................ 705/7.38; 705/7.39
(58) Field of Classification Search ................. 705/7.38
See application file for complete search history.

(56) References Cited

U.S. PATENT DOCUMENTS

| | | | | |
|---|---|---|---|---|
| 7,707,052 B2* | 4/2010 | Kuhn et al. | | 705/7 |
| 2004/0138944 A1* | 7/2004 | Whitacre et al. | | 705/11 |
| 2004/0210475 A1* | 10/2004 | Starnes et al. | | 705/11 |
| 2006/0149646 A1* | 7/2006 | Foote | | 705/35 |
| 2006/0233349 A1* | 10/2006 | Cooper | | 379/265.06 |

OTHER PUBLICATIONS

Barry Gerhart George T. Milkovich, "Organizational Differences in Managerial Compensation and Financial Performance", Academy of Management Journal; Dec. 1990; 33, 4; p. 663.*

* cited by examiner

*Primary Examiner* — Romain Jeanty
*Assistant Examiner* — Mark Fleischer
(74) *Attorney, Agent, or Firm* — Stanley J. Gradisar Attorney At Law, LLC; Stanley J. Gradisar

(57) ABSTRACT

In embodiments, the present invention relates to methods and systems for monitoring performance of employees, contractors and other agents employed to perform tasks on behalf of a company, business organization or other entity. In an embodiment, the present invention involves defining performance metrics that relate to achievement values. The achievement values are associated with defined performance levels. Performance statistics that relate to an agents performance are collected and compared to the achievement values to characterize an agent's performance within one of the performance levels. The performance level achieved by an agent and the compensation of the agent are graphically displayed, and in some embodiments used to determine compensation adjustments.

18 Claims, 9 Drawing Sheets

PERFORMANCE OPTIMIZATION

CROSS-REFERENCE TO RELATED APPLICATIONS

This patent application claims priority to U.S. Provisional Patent Application No. 60/763,070, entitled PERFORMANCE MONITORING filed on Jan. 27, 2006; U.S. patent application Ser. No. 11/556,003, entitled SHARED CALL CENTER SYSTEM AND METHODS, filed Nov. 2, 2006. The entire contents of U.S. Provisional Patent Application No. 60/763,070 and U.S. patent application Ser. No. 11/556,003 are hereby incorporated by reference in their entirety as if set forth herein in full. The present application is related to U.S. patent application Ser. No. 11/627,671 entitled PERFORMANCE OPTIMIZATION, filed on the same date as the present application, and hereby incorporated by reference in its entirety; and is also related to PCT Patent Application No. PCT/US2007/002209 entitled PERFORMANCE OPTIMIZATION, filed on the same date as the present application, and hereby incorporated by reference in its entirety.

BACKGROUND

Businesses and other organizations must consistently manage the performance of their employees in order to maximize the employees' contribution to the organization to help the organization achieve its strategic goals. It is difficult to establish a system that consistently inspires and motivates employees. Motivating and inspiring employees is more challenging in client services industries because, although the employees are employed by an organization, they are performing tasks for clients or customers of the organization. This situation creates a disconnect between employees' motivation to improve their performance, and the clients or customers' achievement of strategic goals.

Compensation is sometimes used as a way of motivating employees. However, oftentimes the performance of employees is not adequately linked to their compensation, making compensation an ineffective motivator. As an example, if decisions about compensation involve too much subjectivity, then it will not serve as an effective tool for motivating employees.

There are various approaches that attempt to address performance management and compensation to employees in the marketplace. For example, common approaches involve performance reviews, merit increases, incentive plans, and recognition programs that attempt to solve the performance management and reward issues within organizations. Some of these approaches include running reports to determine "after-the-fact" performance at the end of a reporting period. All of these approaches force managers and supervisors to review data from many sources and to try to subjectively determine agent performance by their own mental analysis.

SUMMARY

This summary is intended to generally describe embodiments of the present invention, which are described in greater detail below. It should be understood that the summary is not intended to limit the scope of the present invention, or be used to limit the scope of the claims attached below.

In embodiments, the present invention provides a computer implemented method that is useful, generally, for managing an employee, i.e., an agent employed by an organization. The method may have a number of embodiments, some examples including, but not limited to, methods for managing an agent, methods for aligning the compensation of an agent with goals of an organization, and methods of incentivizing an agent to improve their performance. In one embodiment of the present invention, the method includes defining a performance metric that relates to a goal of an organization. Performance levels are then defined for the performance metric. The performance levels are associated with an achievement level that an agent's performance with respect to the metric must meet to have their performance classified within a performance level. The achievement levels are based on an agent's experience, i.e., the more experienced an agent is, the better the agent will be expected to perform. The method also includes providing a base pay/incentive rule that defines the consistency of achievement an agent must reach to change their current base pay or receive extra incentive pay. The achievement of an agent with respect to the performance metric is then tracked and displayed to an agent to inspire and motivate the agent's performance, which is compared to the previously established achievement levels to determine an agent's performance level.

In other embodiments, the method may include additional steps, such as automatically applying the compensation rule based on the agent's performance to change a compensation of the agent. The change in compensation may be an increase or decrease. In those embodiments, in which the change in compensation is an increase, the increase may be in the form of a bonus (variable pay component) or an increase in a base salary/wage (base pay component). In another embodiment, the method may include the additional steps of communicating the compensation rule to the agent, and providing the agent with access to performance information, which includes the agent performance metrics, the achievement levels and the resulting agent performance level. This embodiment provides for incentivizing an agent to improve their performance, because they are made aware of the direct relationship of their performance to their compensation, and can also monitor their performance.

In embodiments, the present invention can be used to compare, in a normalized manner, resulting performance across disparate agent roles that may have very different performance metrics and achievement levels. This allows managers and team leaders to compare and make better decisions regarding managing performance across an enterprise. In one embodiment, performance is normalized in an easy to understand matrix that compares agent performance to compensation levels to determine the value of agents' contributions.

DETAILED DESCRIPTION

Figure 1:
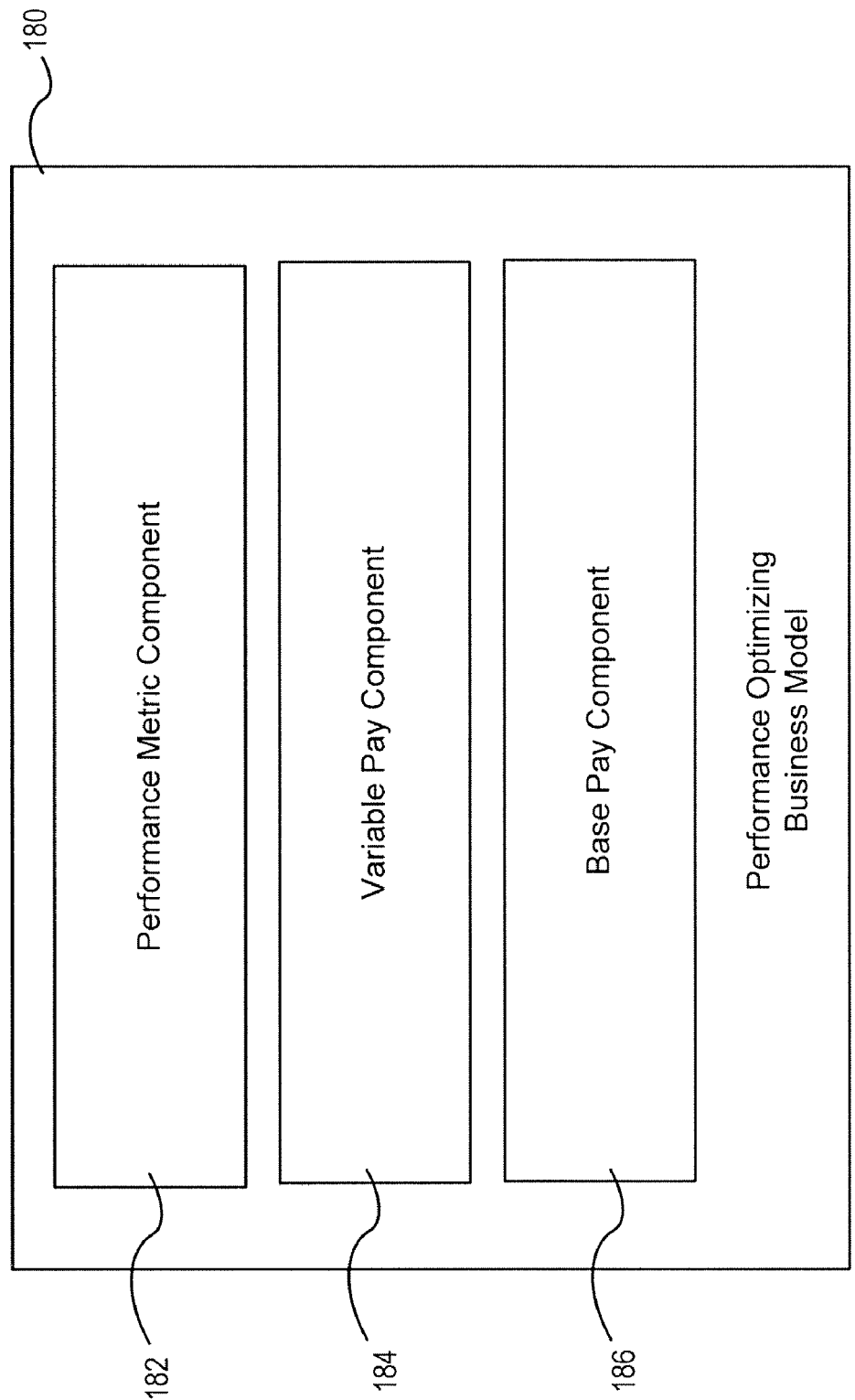
FIG. 1 is a conceptual depiction of a business model for performance optimization according to an embodiment of the present invention.

The present invention and its various embodiments are described in detail below with reference to the figures. When referring to these figures, like structures and elements shown throughout are indicated with like reference numerals. Software components, which may include routines, constructs and any other form of source or binary code or visual elements rendered there from, are logically and generally depicted in the figures using dashed lines.

In general, the present invention is directed, in embodiments, to optimize performance of employees, contractors and other agents employed to perform tasks on behalf of a company, business organization or other entity. In an embodiment, the present invention involves an approach for integrating performance optimization techniques with compensation practices, thereby creating an innovative rewards system to drive results from these individuals, which, for simplicity, are collectively referred to herein as "agents." While designed to inspire and motivate agents to achieve strategic goals in the client service industry (i.e., for an organization's clients), this approach also creates an effective platform for coaching employees to increase performance. With respect to the former, the present invention results in performance optimization being a daily, weekly, and/or monthly event.

The present invention, in embodiments also provides for incentivizing agents that are paid with an hourly wage or another form of a fixed salary. Previously, it has been difficult to motivate agents based on their base pay. Using embodiments of the present invention described below, hourly or fixed salary agents have adjustments or changes to their base salary (pay) tied to their performance in relation to metrics aligned with goals of an organization. If an agent continues to perform at increasingly higher levels of performance, their base salary (or performance consistency incentive in international countries) will increase. In some embodiments, if an agent's performance continually declines their base salary (or performance consistency incentive in international countries) will decrease. These adjustments can be designed to occur automatically, without any input from a supervisor, so that an agent can feel confident that once they reach a particular level of performance, they are guaranteed an increase in their salary.

The performance optimization approach involves monitoring performance of certain tasks by agents against a defined set of metrics that are linked to financial aspects concerning the agents over a given period in time. With respect to customer service agents and teams, exemplary metrics include, but are not limited to, call resolution statistics (e.g., statistics that relate to the extent to which a customer service agent or team of agents resolve calls without customers having to call back, i.e., "first call resolution"), customer satisfaction statistics, revenue statistics, attrition statistics, call reduction statistics (e.g., statistics that relate to whether a customer service agent or team of agents address customers' multiple concerns or questions in a single call) and quality assessment statistics.

In accordance with an embodiment, the financial aspects relate to compensation such as, for example, variable compensation and base compensation, thereby providing an indication of individual performance relative to compensatory expectations. For example, while one agent's monthly performance may be exceptional relative to his or her compensation for that month; another agent having the same exact monthly performance may lag behind expectations because of his or her higher compensation. In addition to monitoring individual agent performance, the present invention also relates to monitoring performance of a group of agents as a whole such as for example, a team of agents or a project or other business entity. For illustrative purposes, these "agents" are described herein as being customer service agents employed by an "outsourcing" company to perform customer service tasks for a "client" company, however the present invention is not limited thereto. In other embodiments, the present invention may be applied to any type of employee including retail employees.

In accordance with this illustrative embodiment, the performance optimization approach of the present invention generally provides inspiration and motivation for agents to achieve the strategic goals of the client company. Not only does performance management become a daily, weekly, and/or monthly event, but this approach provides an effective platform for training and coaching. In an embodiment, the performance optimization approach is implemented on a computer-based system and available to agents, team leaders (e.g., supervisors) and management to access at any given time. However, Applicant's inventive concept for performance optimization is also applicable in non-computing environments. Accordingly, the present invention is embodied in a conceptual business model in addition to a computer-based implementation, each of which is described in turn below and then described in detail as combined with one another.

I. Business Model Approach for Performance Optimization

In an embodiment, the performance optimization (PO) business model 180, which in commerce is referred to as "OPTIMUM REWARDS™," is based on a framework having a "performance metric" component 182, a "variable pay" component 184 and a "base pay" component 186. The performance metric component 182 involves processes that include analyzing contractual expectations, determining ROI, selecting applicable metrics, setting achievement levels, communicating achievement levels to agents, providing feedback/coaching, and delivering rewards, which offers agents an incentive to excel in their work to ultimately drive company performance. The defined metrics may relate to any performance consideration and, in an embodiment, are based on strategic goals and expectations with regard to tasks that agents are employed to perform on behalf of an organization. In alternative embodiments, the metric relates to tasks that agents are employed to perform on behalf of a client of the organization. Such business relationships are common particularly in the customer service industry in which contracting companies employ customer service agents to take calls from other companies' customers. However, the PO business model 180 is useful in any relationship where an agent is employed to perform tasks.

Referring back to the framework, the variable pay component 184 determines whether and to what extent an agent is entitled to variable pay based on their achievement level of defined performance metrics for a period of time (e.g., daily, weekly, or monthly). The base pay component 186 determines each agent's base compensation package by taking into account each agent's consistent level of achievement over time (e.g., daily, weekly, or monthly). The performance metric component 182, the variable pay component 184 and the base pay component 186 are further described below in turn:

The performance metric component 182 provides an illustration of the combination of a unique systematic process to set metrics, communicate achievement levels to agents, provide feedback/coaching, and deliver meaningful rewards, which motivates and inspires employees to excel in their work. Performance optimization thus becomes self-directed in that employees are given access to near real-time performance and tools to increase performance at their desktop. Furthermore, this component allows performance optimization to be near real-time and focused on improving performance.

In an embodiment, the variable pay component 184 rewards agents based on their achievement level of defined performance metrics each month. Examples of features of the variable pay component 184, for one embodiment, are provided below:

1) One to four key performance metrics are chosen that align individual agent performance with a company's strategic goals which produces desired results.
2) Within the plan design, four achievement levels are defined, which focuses agents on achieving a higher level of performance each month.
3) To qualify for a specific achievement level, participants must achieve the required results for all chosen key performance metrics.
4) In addition to individual achievement levels, team modifiers can be added to the plan to reward team success. Only team members who receive an individual award are eligible for the team award modifier.
5) To be eligible for variable pay, employees must meet one or more qualifying metric goals such as, schedule adherence, which acts as a trigger for any variable pay payment.

In some embodiments, variable pay may be defined as a percentage of base pay. For example, variable pay may be defined as 5%, 10%, 15%, or 20% of base pay.

In an embodiment, the base pay component 186 is linked to an agent's consistent level of achievement over time. Examples of features of the base pay component 186, for an embodiment, are provided below:

1) Agents are paid an initial hourly base pay rate corresponding to an achievement level.
2) Agents' hourly base pay rate is subject to increases or decreases which are linked to consistent achievement of the chosen performance metrics.
3) In order to receive a base pay rate increase, agents must achieve a higher level of performance than the level corresponding to their current pay for three consecutive months. Similarly, an agent's base pay rate will be decreased (but never below the initial hiring rate) in the event that their level of performance falls below the associated performance level of their current base pay rate for three consecutive months.

In some embodiments, the PO business model 180 is embodied in a number of different methods that may relate for example to managing the performance of an agent and providing incentives to an agent to increase their performance.

Figure 2:
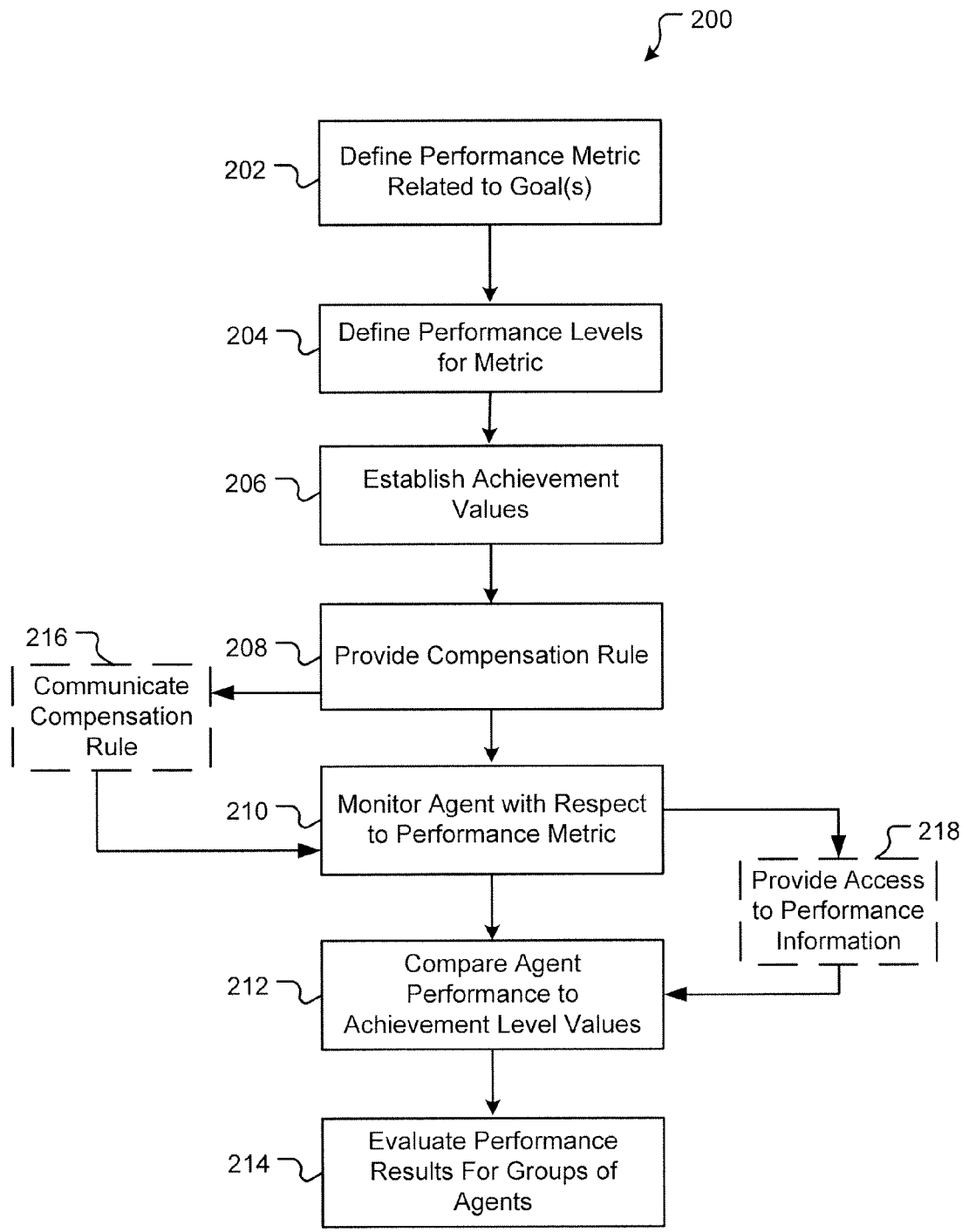
FIG. 2 is a flow diagram illustrating operational characteristics of a process, embodying the business model of FIG. 1, for optimizing the performance of an agent.

As one example, FIG. 2 is a flow diagram illustrating operational characteristics of a method 200, embodying the PO business model 180, for managing the performance of an agent. The method 200 is described below with reference to only one agent and one metric for simplicity purposes; however, it should be appreciated that in some embodiments the process is practiced in numerous instances for each agent in an organization and may involve defining a number of different metrics. Moreover, the process is described with respect to an agent employed by an organization. However, in other embodiments it is applied to an agent employed by an organization to perform tasks for a client of the organization. It should be understood that although the steps of method 200 are described in a particular order, in other embodiments some of the steps may be performed in a different order.

Method 200 begins with a define step 202, which defines a metric that is related to a goal of an organization. The metric is a measurable quantity that correlates to achieving a specific goal of an organization. For example, in one embodiment an organization may have a goal to reduce the number of service calls that a customer must make to get an issue resolved. A metric that may be defined (at step 202) that relates to that goal may be referred to as "first call resolution," which is measured by how many customers call a second time, within 24 hours, after calling a first time. As another example, an organization may have a goal of increasing revenue. A metric that may be defined (at step 202) that relates to that goal may be referred to as "cross-selling," which is measured by sales revenue generated from customer service calls. These are merely some examples of metrics that may be defined in relation to goals of an organization. Those with skill in the art will appreciate that the specific metrics defined at step 202 will relate to the specific goals of the organization and are not limited to the examples described above.

After step 202, a second define step 204, is performed to define a plurality of performance levels for the performance metric defined at step 202. The performance levels are intended to represent a relative level of performance of an agent for the metric defined in step 202. In one embodiment, the performance levels may be defined as below threshold, threshold, target and stretch. As those with skill in the art will appreciate, the number of levels as well as the labels applied to the levels is a matter of preference and any number of levels referred to with any label may be defined at step 204. Each of the performance levels defined at step 204 is associated with an achievement value for the performance metric. The achievement values are established at step 206.

At step 206, the achievement values associated with the performance levels defined at step 204 are established based on factors such as the experience level of an agent. The achievement values are values that an agent must achieve, for a defined metric, in order for their performance to be classified/categorized within one of the defined performance levels. In one embodiment, average call handling time may be defined as a metric, and the performance levels may be defined as below threshold, threshold, target, and stretch. In this embodiment, at step 206, achievement values of: >360 seconds, 360 seconds, 340 seconds and 320 seconds are established for the defined performance levels of: below threshold, threshold, target, and stretch, respectively. Accordingly, for an agent's performance to be classified as threshold the agent must achieve an average call time that does not exceed 360 seconds. If an agent's average call time is less than the 320 seconds value, their performance will be classified as stretch (performance level).

The achievement values established at step 206 are based on contractual or strategic goals and can be adjusted based on the experience of an agent. For example, if a first agent has more experience than a second agent, the achievement values established for the first agent could require a better agent performance for each performance level in order to reflect the higher experience of the first agent. From the perspective of an organization, setting of the achievement values in relation to experience is an effective way to tie an agent's tenure/experience to performance. Referring back to the previous example, an agent that is more experienced may have average call handling time achievement values established at step 206 of: >340 seconds, 320 seconds, 310 seconds and 300 seconds for the defined performance levels of: below threshold, threshold, target, and stretch, respectively.

After the achievement values have been established at step 206, a compensation rule is provided at step 208. The compensation rule defines which of the performance levels an agent must achieve to change their current compensation, as well as the change to an agent's compensation. The change may be an increase or a decrease in the current compensation of an agent, or in a component of their compensation (e.g., base pay or variable pay). In one embodiment, the compensation rule may provide for increasing the compensation of an agent if an agent achieves a performance level above the threshold performance level. In an alternative embodiment, the compensation rule may provide for decreasing the compensation of an agent if an agent achieves the below threshold performance level. In some embodiments, the change in compensation may be reflected in the variable component 184, described above with respect FIG. 1, such as may be the case when providing a bonus to an agent who achieves a performance level above the threshold performance level. In other embodiments, the change in compensation may be reflected in the base pay component 186, described above with respect to FIG. 1.

In some embodiments, the compensation rule may define a time over which an agent must achieve a particular performance level to change their current compensation. For example, the compensation rule may define that an agent must achieve a performance level above the threshold performance level for three months to increase their current compensation, or a portion of their compensation, such as their base pay. In another example, the compensation rule may define that an agent must achieve a performance level below the threshold performance level for three consecutive months to have some portion of their compensation reduced. In some embodiments, the compensation rule may define two or more periods of time over which an agent must achieve a particular performance level to change their current compensation. In one embodiment, a compensation rule may define a first time (e.g., a month) over which an agent must achieve a level above the threshold level to receive a bonus (variable pay); a second time (e.g. three months) over which an agent must achieve a performance level above the threshold performance level to increase their base pay; and a third time (e.g. two months) over which an agent must achieve a performance level less than the threshold performance level to decrease their base pay.

In one embodiment, the compensation rule is designed to account for an organization's concern over profits. As one example, in the customer service industry a client may contract an organization which employs customer service agents to take calls from the client's customers. In this example, the client may pay the organization a set amount of money per agent. The more an agent is paid by the organization, the less the organization will make as profit. Accordingly, the compensation rule may be adapted to reflect this. In one embodiment, an agent must achieve a performance level above a defined performance level, e.g. the threshold performance level, to increase their base pay. However, when their base pay increases, the amount available for variable pay will decrease. For example, an agent may have a base pay of $10.00/hour and the potential for receiving a variable pay amount that is 20% of their base pay. If the agent performs at a high level for a predetermined period of time, their base pay may increase to $11.00/hour, however their potential variable pay may be reduced to only 10% of their base pay. This type of compensation rule still incentivizes agents, because their base pay (i.e., guaranteed money) is increased with better performance, but also takes into consideration the costs/margins of an organization. It is contemplated that other compensation rules may be defined to apply to various situations, and the present invention is not limited to any specific compensation rule.

After the compensation rule has been provided at step 208, step 210 is performed to monitor an agent with respect to the performance metric (defined at step 202). Step 210 may be performed in any suitable way such as collecting and aggregating data for an agent. As those with skill in the art will appreciate, the specific steps that are performed will depend on the metrics defined at step 202. As one example, if a metric is defined as average call handling time, step 210 will include monitoring the average call handling time of an agent. The monitoring of average call handling time may be performed by monitoring each individual call time and obtaining an average of each individual call time. In an alternative embodiment, the average call time may be calculated by monitoring the total call time and the total number of calls, and calculating the average call time by dividing the total call time by the total number of calls. As another example, if first call resolution is defined as a metric, step 210 may include monitoring whether a customer who calls a first time must call a second time to resolve the problem.

In embodiments, step 210 results in obtaining an agent performance. The agent performance represents the performance of an agent with respect to a defined metric. In some embodiments, the agent performance is defined as a quantifiable, objective value, e.g., average call time, number of calls handled, first call resolution, revenue etc. In other embodiments, the agent metric is represented as a numeric value, but may have a subjective component. For example, an agent's performance with respect to customer satisfaction may be rated using a numeric scale, e.g., a scale from one to five. An agent's performance may be used in some embodiments in step 212 to categorize/classify an agent's performance within one of the performance levels.

At step 212, the agent performance generated during step 210 is compared to the achievement values to determine an agent performance level. The achievement values are used to determine which of the performance levels an agent's performance should be classified within. Generally, at step 212 an agent's data is compared to the achievement values to determine which of the achievement values has been met. The agent's performance is then classified as falling within the performance level associated with the met achievement value. Expanding on a previous example for illustrative purposes, if an agent's average call time (agent performance metric) is below the achievement value associated with the "target" performance level, then the agent's performance with respect to the metric, average call handling time, will be classified as "target."

At step 214, the performance results for a group of agents, such as all the agents in a business organization, is evaluated. Step 214 involves aggregating the performance of a number of agents to determine how many are performing at each performance level defined at step 202. In embodiments, step 212 may involve evaluating groups of agents based on an entire business organization, teams, projects, clients for which the agents are working, sites, or regions.

In embodiments, step 214 provides for evaluating different groups of agents in a normalized way. That is, since all of the agents are evaluated using the same performance levels (e.g., below threshold, threshold, target and stretch), a normalized comparison can be made to determine which groups are performing better relative to other groups. For example, if a group of agents (team 1) is working on a project, and a second group (team 2) is working on another project, at step 214 a comparison between the two teams can be made to determine which team is performing at a relatively higher level, such as which team has more agents performing at stretch or which team has less agents performing at below threshold. In embodiments, the two teams may have different metrics, different achievement values, and compensation levels, however because the performance levels are the same the normalized comparison can be made. This embodiment may be particularly useful to managers who need to decide which group of agents need additional coaching or support. The ability to compare groups of agents in a normalized way allows managers to decide which groups of agents they should direct their efforts toward for improving performance.

Method 200 described above with respect to FIG. 2 is simply one method that implements PO business model 180. In other embodiments, method 200 may include more, or less, steps than those described above with respect to FIG. 2, or the steps may be performed in different order. For example in one embodiment, step 214 may be followed by an applying step which automatically applies the compensation rule based on the agent performance level to change the current compensation provided to the agent. Applying of the compensation rule may occur automatically without any input by a human supervisor. In other embodiments, the step 214 may be followed by an evaluating step. The evaluating step may be performed by a human supervisor to determine whether the compensation rule should be applied. In other embodiments, the evaluating step may be performed to determine whether/how a supervisor should provide coaching or other feedback to the agent.

As another example, illustrated in FIG. 2 as steps 216 and 218 shown in dashed lines, method 200 may include additional steps such as communicating the compensation rule to the agent 216 and providing access to performance information to the agent 218. The performance information may relate to, for example, the agent performance, achievement values, and agent performance level. In this embodiment, the additional steps tend to incentivize an agent, because they are aware of how their compensation is affected by their performance and have access to their performance information.

In embodiments, method 200 may include steps for changing the achievement values. In one specific embodiment, if an agent's compensation is changed as a result of their performance, the achievement values are adjusted to reflect the change in the agent's compensation. That is, if an agent gets an increase in their compensation (e.g., increase in base pay) the achievement values are changed so that an agent must perform at a higher level than before to achieve each of the performance levels. In other embodiments, the achievement values may be changed based on the performance of a group of agents, such as a team or the entire organization. As one example, an average agent metric for a group of agents may be compared over a period of time (e.g., several months). If the comparison indicates that the agents' performance as a group is showing a trend, the achievement values may be changed as a result of the trend. The threshold values may be changed to require the agents to perform at a relatively higher level to achieve the performance levels.

It should be understood that the foregoing description of PO business model 180 and method 200 implementing PO business model 180 are for illustrative purposes only. The following description includes discussion of PO business model 180 as implemented using a computer-based approach. The present invention contemplates that in some embodiments the steps described above, made without reference to a computer-based approach, and the steps described below with respect to the computer-based approach may be combined in a variety of combinations, and may be implemented with or without the use of a computer system.

II. Computer-Based Approach for Performance Optimization

Figure 3:
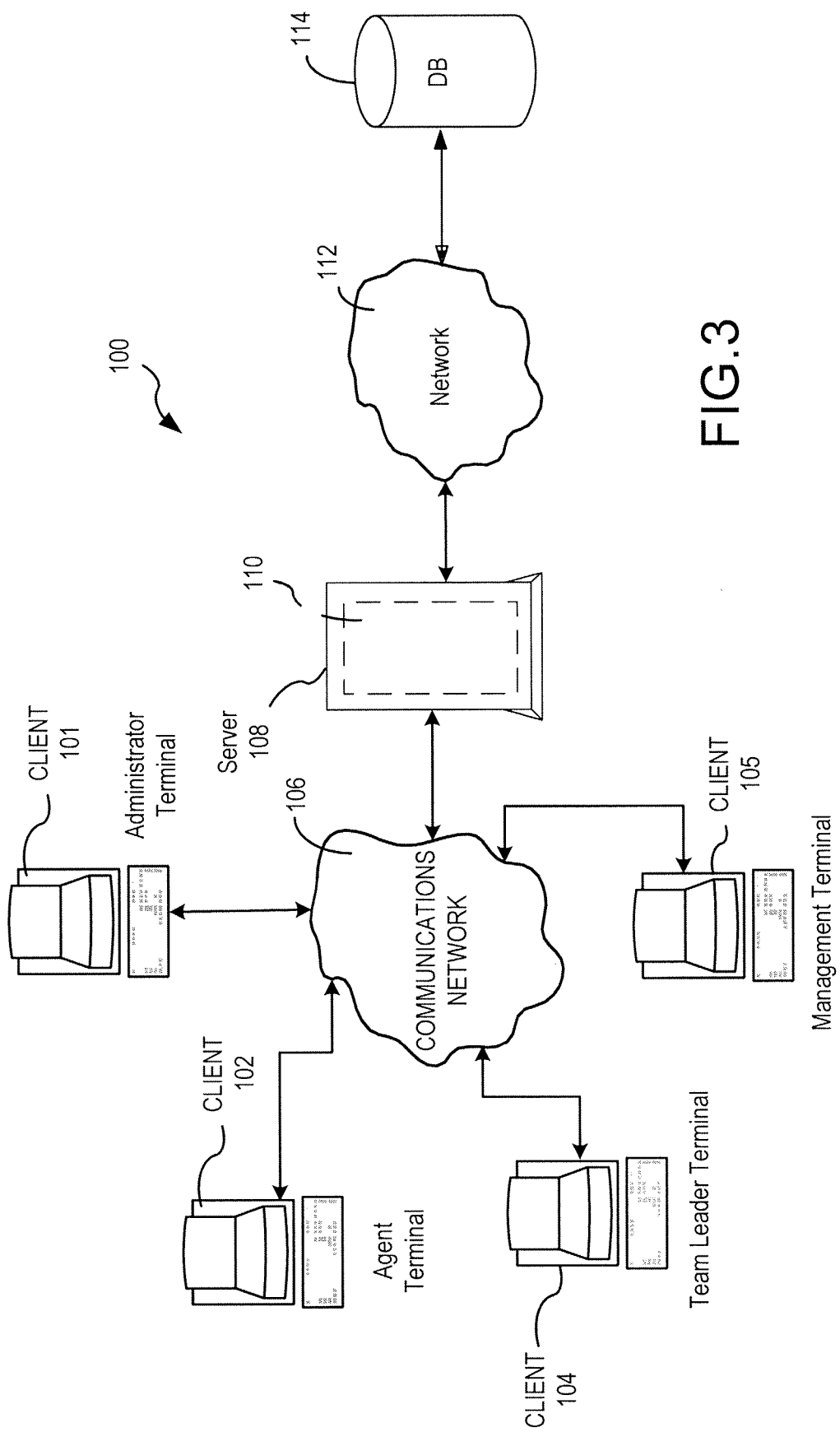
FIG. 3 is a network environment in which a software application to support the process is implemented in accordance with an embodiment of the present invention.

In accordance with an embodiment, the PO business model 180 described above is embodied within a software application 110 implemented in a distributed computing environment 100, as shown in block diagram form in FIG. 3. The distributed system 100 includes a plurality of client computers 101, 102, 104 and 105, a communications network 106 (hereinafter, "network"), a server computer 108, and a database 114. The performance optimization software application 110 resides on the server computer 108 and is accessible to any of the plurality of client computers 101, 102, 104 and 105 by way of the communications network 106. The software application 110 may be activated, controlled and manipulated by users on the client computers 101, 102, 104 and 105 at remote locations using conventional networking technologies. Furthermore, browser applications (not shown) are implemented on the client computers 101, 102, 104 and 105 and used to render electronic resources (e.g., web pages) containing information related to performance management. For simplicity and clarity, the software application 110, which is described in detail below in connection with FIG. 3, is hereinafter referred to as a "performance optimization application 110."

As depicted in FIG. 3, the distributed system 100 may be thought of as having two distinct components: "front-end" client computers 101, 102, 104 and 105 and the "back-end" server computer 108 on which the performance optimization application 110 is implemented. In accordance with an embodiment of the present invention, the back-end server component 108 can be a personal computer, a minicomputer, or a mainframe that performs, among other functions: data managing, client information sharing, security services and administration functions related to the performance optimization application 110. A server farm (not shown) may alternatively be used. The distributed system 100 is not limited to any particular implementation and instead embodies any computing environment upon which functionality of the environment may be practiced.

While only four client computers 101, 102, 104 and 105 are shown, it should be appreciated that the distributed system 100 may include any number of client computers. For example, in an embodiment, the communications network 106 may be the Internet or, alternatively, an Intranet, wherein the server computer 108 is a central server on which the performance optimization application 110 resides and is specifically identified to have a network location expressed as a Uniform Resource Locator, or URL. Accordingly, implementation of the performance optimization application 110 renders a web site or, alternatively, Intranet site, identified by the URL and hereinafter referred to for nomenclature purposes as a "performance optimization website." The client computers 101, 102, 104 and 105 thus represent computers connected to the communications network 106 through any conventional means such as, for example, routers and switches. Accessing the performance optimization application 110 therefore involves a user (either an agent, team leader or management) activating a browser application (not shown) on a client computer 101, 102, 104, 105 and directing the browser application to the URL specified for the performance optimization application 110. As shown in FIG. 3, agents access the performance optimization application 110 using the client computer 102; team leaders access the performance optimization application 110 using the client computer 104 and management access the performance optimization application 110 using the client computer 105. Also, shown in FIG. 3 is client computer 101, which allows an administrator to access the performance optimization application 110.

When accessed by a user (e.g., agent, team leader, management, or administrator as described above) over the communications network 106, the performance optimization application 110 renders the aforementioned performance optimization website, which includes various forms of information and functionality related to performance management both from an individual standpoint and a collective (i.e., team-based and organization-based) standpoint. Based on website manipulation by the user, the performance optimization application 110 retrieves such information from the database 114 via network 112 (e.g., an intranet) or, alternatively, from local cache memory, and provides that information to the user's browser for rendering therein.

Figure 4:
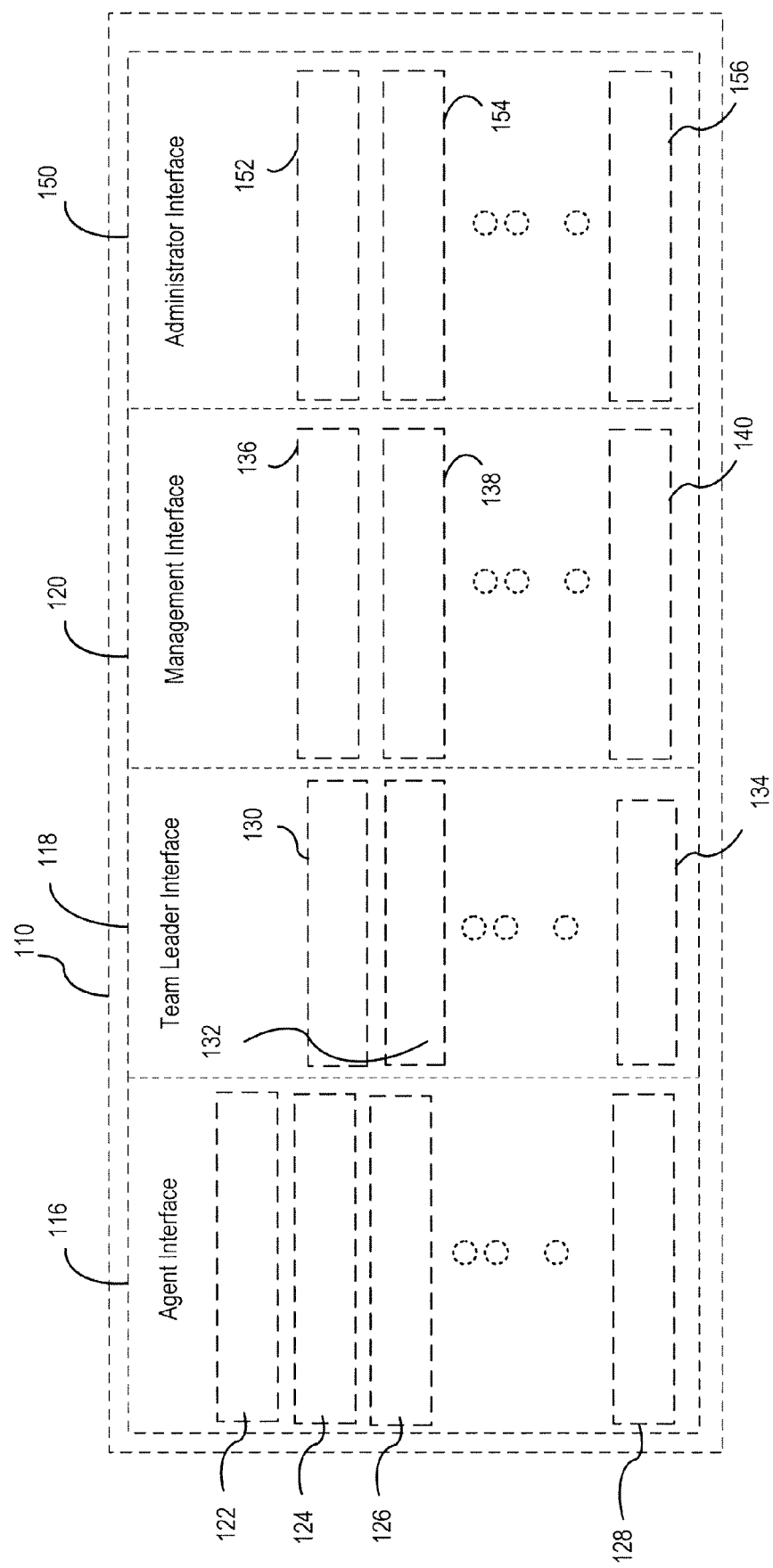
FIG. 4 illustrates a logical representation of the performance optimization software application shown in the network environment of FIG. 3 in accordance with an embodiment of the present invention.

With reference now to FIG. 4, the performance optimization software 110 is described in more detail with reference to information and functionality provided by the software 110 in accordance with an embodiment of the present invention. Specifically, in accordance with this embodiment, the performance optimization software 110 includes an agent interface 116, a team leader interface 118, a management interface 120, and an administrator interface 150. The performance optimization software application 110 may be referred to in commerce as "EMPOWER™" and, similarly, the agent interface 116, the team leader interface 118 and the management interface 120 are referred to as "EMPOWER1™," "EMPOWER2™" and "EMPOWER3™," respectively.

The performance optimization software application 110 provides specific interfaces 116, 118, 120, and 150 and associated levels of access to users based on whether the users are agents, team leaders, management, or administrators. Each interface 116, 118 120, and 150 embodies one or more electronic resources that provide information and/or functionality specifically intended and authorized for one of these specific types of users. When accessed by a user, an instance of the performance optimization website is created on the server computer 108 and one of these interfaces (116, 118, 120, or 150) is activated to render electronic resources relevant for that user. For example, if the user is an agent, the agent interface 116 is activated to render electronic resources (e.g., web pages) specifically configured (in content and format) to that agent.

With specific reference to these interfaces 116, 118, 120, and 150 the agent interface 116 provides agents with access to information concerning their specific performance relative to a certain time including an indication of how their performance affects, could affect (if maintained) and/or has affected their compensation. In an embodiment, performance is measured against a set of defined metrics and, as such, the agent interface 116 provides agents with an indication of how their performance ranks against the defined metrics during a given time period (e.g., day, week, month, year). This information may be presented in numerous different formats and, to accommodate the format in which the information is displayed, the agent interface includes user interface features, generally shown as 122, 124, 126 and 128, which provide agents with the ability to view the information in a variety of formats and details. Table 1 below illustrates an example of a graphical representation that may be displayed by interface 116 in some embodiments (in other embodiments Table 1 may be displayed by anyone of interfaces 116, 118, 120, or 150). Table 1 illustrates a graphical representation that relates a performance level achieved by an agent to a time period, in this case a month over which the agent achieved the performance level. In other embodiments, the graphical representation may relate the performance level achieved by an agent to the day the agent achieved the performance level (e.g., a calendar with a graphic indicating an achieved level for each day of a month). Also, in other embodiments, Table 1 may relate to a group of agents (i.e., a team) or an organization as a whole.

TABLE 1

|  | January | February | March | April |
|---|---|---|---|---|
| Stretch | | | | |
| Target | | | | |
| Threshold | | | | |
| Below Threshold | | | | |

In some embodiments, agent interface 116 provides for displaying a graphical representation of an agent's achieved metric relative to one or more achievement values. This allows the agent to easily determine how to change their behavior (e.g., spend less time on a call) so that they can achieve a desired achievement level and therefore performance level. For example, agent interface 116 may display a graphical representation, such as a bar graph with four bars that represent achievement values. In this embodiment, the bar graph will also include one bar showing the agent's performance metric. This graphical representation allows a viewer (e.g., an agent or supervisor) to easily see, where the agent's metric is in relation to achievement values.

The team leader interface 118 allows each individual responsible for supervising tasks of a team of agents to access information concerning the performance of his or her group as a whole. As noted above, such performance is measured against a defined set of metrics in accordance with an embodiment. Additionally, the team leader interface 118 provides these individuals access to the agent interface 116 such that they are able to access performance information concerning each of the agents within their team. The team leaders are only authorized to use the agent interface 116 to view information concerning the agents associated with their team. This information may be presented in numerous different formats and include user interface features, generally shown as 132, 130, and 134, which provide team leaders with the ability to view the information in a variety of formats with varying degrees of detail.

In contrast, the management interface 120 is associated with unrestricted authorization to performance information and provides access to such information concerning each individual agent, each team of agents and, collectively, all agent teams as a whole. The management interface 120 therefore provides its authorized users with access to performance information for the entire company or organization as well as access to the agent interface 116 and the team leader interface in order to view performance data for agents and teams, respectively. This information may be presented in numerous different formats and include user interface features, generally shown as 136, 138, and 140.

Administrator interface 150 is associated with unrestricted authorization to performance information and provides access to such information concerning each individual agent, each team of agents and, collectively, all agent teams as a whole. Additionally, the administrator interface 150 provides authorized users with privileges to establish, modify, or remove performance metrics, performance levels, and compensation rules. Administrator interface 150 also provides authorization to change information about agents, such as adding or removing agents or teams of agents from application 110. Administrator interface 150 includes user interface features, generally shown as 152, 154, and 156. As those with ordinary skill in the art will appreciate, administrator interface 150 is also used to perform general administrative tasks that may be required on application 110.

In an embodiment, the present invention is practiced as a method for determining whether a user requesting access to the performance optimization software application 110 is an agent, a team leader, management, or an administrator, and based on the determined type of user, the method returns the appropriate interface 116, 118, 120, or 150.

The graphical representations described above, and those further described below, are also useful in methods and processes that are not implemented using computer systems. As mentioned above, it is contemplated that in some embodiments the present invention will combine features, aspects, components, steps, and processes described herein with respect to the computer implemented methods, with those described above without the use of computer systems.

Figure 5:
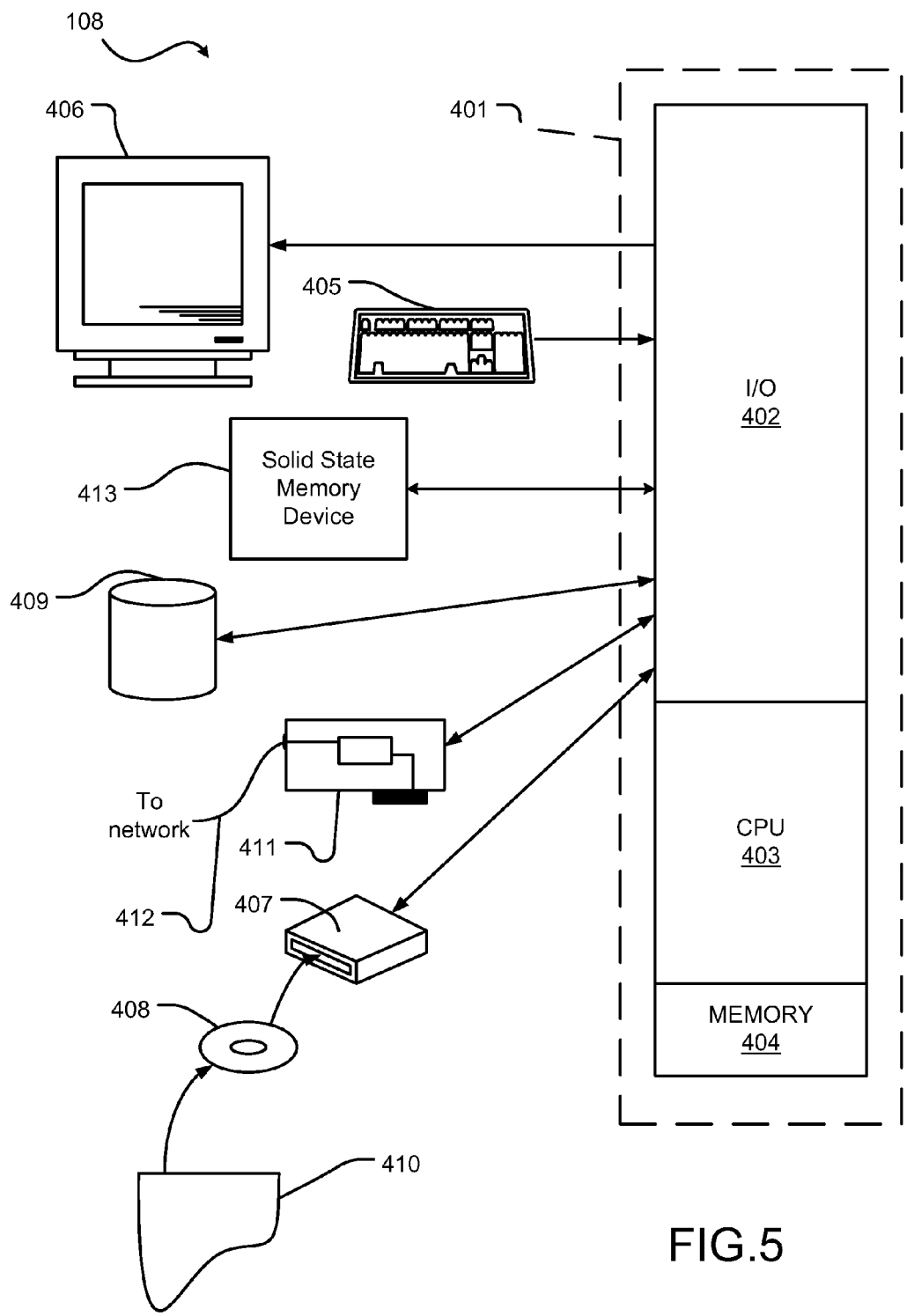
FIG. 5 depicts a computing system upon which embodiments of the present invention may be implemented.

With the various software components of the performance optimization system 110 described in detail above, attention is now turned to a detailed illustration of the various components of the exemplary operating environment on which the performance optimization application 110 is at least partially implemented, i.e., the sever computer 108. Exemplary elements of a server computer 108 are shown in FIG. 5 wherein the processor 401 includes an input/output (I/O) section 402, a microprocessor, or Central Processing Unit (CPU) 403, and a memory section 404. The present invention is optionally implemented in this embodiment in software or firmware modules loaded in memory 404 and/or stored on a solid state, non-volatile memory device 413, a configured CD-ROM 408 or a disk storage unit 409.

The I/O section 402 is connected to a user input module 405, e.g., a keyboard, a display unit 406, etc., and one or more program storage devices, such as, without limitation, the solid state, non-volatile memory device 413, the disk storage unit 409, and the disk drive unit 407. The solid state, non-volatile memory device 413 is an embedded memory device for storing instructions and commands in a form readable by the CPU 403. In accordance with various embodiments, the solid state, non-volatile memory device 413 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with this embodiment, the disk drive unit 407 may be a CD-ROM driver unit capable of reading the CD-ROM medium 408, which typically contains programs 410 and data. Alternatively, the disk drive unit 407 may be replaced or supplemented by a floppy drive unit, a tape drive unit, or other storage medium drive unit. Computer readable media containing mechanisms (e.g., instructions, modules) to effectuate the systems and methods in accordance with the present invention may reside in the memory section 404, the solid state, non-volatile memory device 413, the disk storage unit 409 or the CD-ROM medium 408. Further, the computer, readable media may be embodied in electrical signals representing data bits causing a transformation or reduction of the electrical signal representation, and the maintenance of data bits at memory locations in the memory 404, the solid state, non-volatile memory device 413, the configured CD-ROM 408 or the storage unit 409 to thereby reconfigure or otherwise alter the operation of the server computer 108, as well as other processing signals. The memory locations where data bits are maintained are physical locations that have particular electrical, magnetic, or optical properties corresponding to the data bits.

In accordance with a computer readable medium embodiment of the present invention, software instructions stored on the solid state, non-volatile memory device 413, the disk storage unit 409, or the CD-ROM 408 are executed by the CPU 403. In this embodiment, these instructions may be directed toward monitoring performance of individual agents, a team of agents or an organization as a whole as described and shown in detail with reference to FIGS. 1-4 and 6-9. Data used in the analysis of such applications may be stored in memory section 404, or on the solid state, non-volatile memory device 413, the disk storage unit 409, the disk drive unit 407 or other storage medium units coupled to the server computer 108.

In accordance with one embodiment, the server computer 108 further comprises an operating system and one or more application programs. Such an embodiment is familiar to those of ordinary skill in the art. The operating system comprises a set of programs that control operations of the server computer 108 and allocation of resources. The set of programs, inclusive of certain utility programs, also provide a graphical user interface to the user. An application program is software that runs on top of the operating system software and uses computer resources made available through the operating system to perform application specific tasks desired by the user. The operating system is operable to multitask, i.e., execute computing tasks in multiple threads, and in accordance with a preferred embodiment is the Microsoft .Net Framework running on the Microsoft Windows 2000 or 2003 server platform. It should be appreciated, however, that other operating systems are contemplated within the scope of the present invention such as, without limitation, IBM's OS/2 WARP, Apple's MACINTOSH OSX operating system, Linux, UNIX, etc.

In accordance with yet another embodiment, the processor 401 connects to the communications network 412 by way of a network interface, such as the network adapter 411 shown in FIG. 5. Through this network connection, the processor 401 is operable to transmit within the distributed system 100, as described, for example, in connection with the client computers 102 and 104 exchanging data with the server computer 108.

Figure 6:
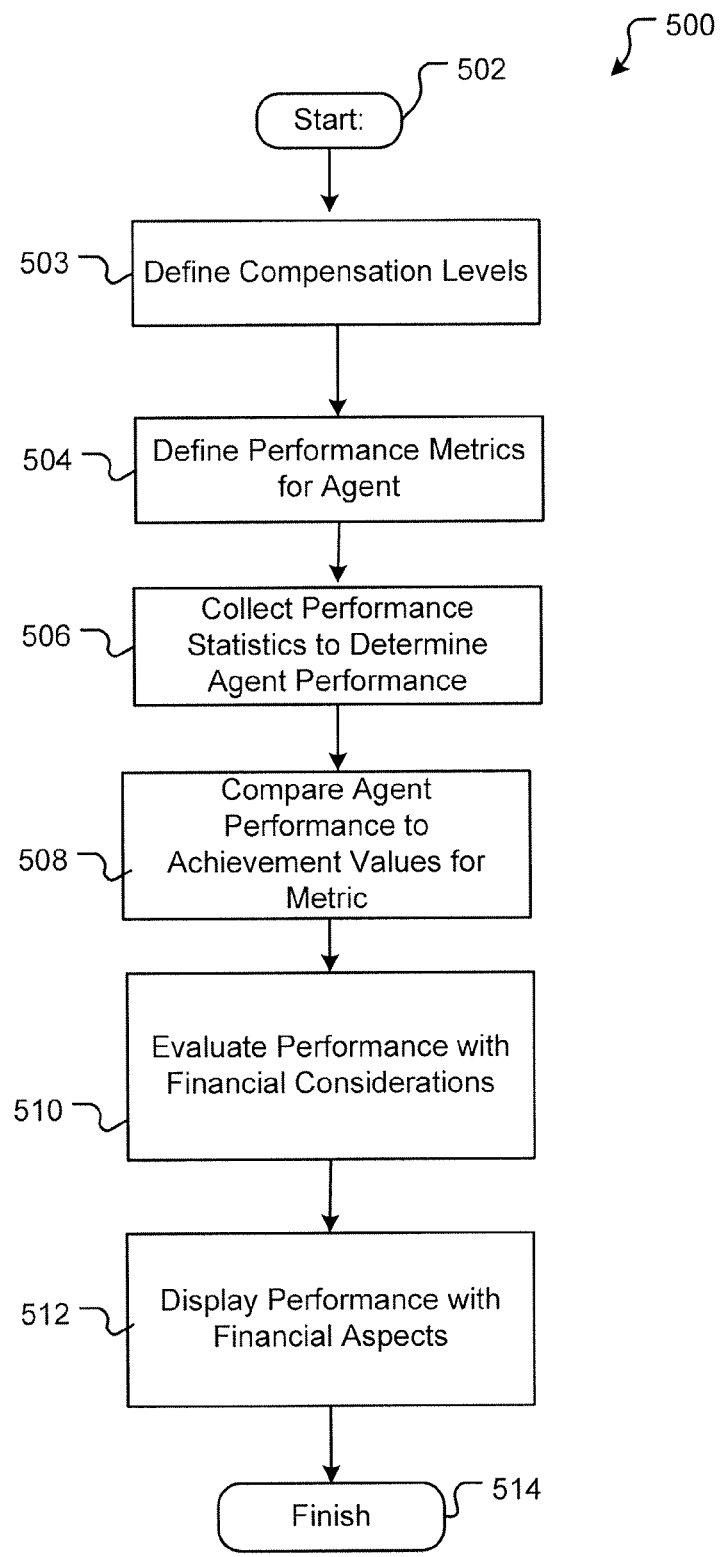
FIG. 6 is a flow diagram illustrating operational characteristics of a method for monitoring performance using the performance optimization software application shown in FIGS. 3 and 4 in accordance with an embodiment of the present invention.

With the computing environment of FIG. 5 in mind, logical operations of the various exemplary embodiments described below in connection with FIGS. 6, 7 and 9 may be implemented: (1) as a sequence of computer implemented acts or program modules running on a computing system; and/or (2) as interconnected machine logic circuits or circuit modules within the computing system. The implementation is a matter of choice dependent on the performance requirements of the computing system implementing the invention. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Accordingly, the various embodiments of the present invention may be implemented as a computer process, a computing system or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

III. Combined Implementation of the PO Business Model and Computer-Based Performance Optimization System FIG. 6 describes an optimization process 500 for implementing the PO business model 180 in conjunction with the performance optimization software application 110 to provide users with a computer-based system for optimizing performance in accordance with an embodiment of the present invention. As such, the optimization process 500 is operable to evaluate an agent's, team's or entire organization's performance against relative criterion, or metrics, and link such evaluation to financial considerations, as described above. With that said, the optimization process 500 is described below with reference to only one agent for simplicity purposes; however, it should be appreciated that the process is preferably practiced in numerous instances for each agent in an organization. The optimization process 500 is performed using an operation flow that begins with a start operation 502 and ends with a finish operation 514. The start operation 502 is initiated to begin monitoring performance of a specific agent in an organization. From the start operation 502, the operation flow initially passes to a first define operation 503.

The first define operation 503 establishes compensation levels, each of which may include, without limitation any of the following: base pay, actual or expected variable pay (e.g., bonuses, in-kind compensation, stock options, etc.) or any other compensation. In an embodiment, the first define operation 503 defines a number of compensation groups, or "compensation levels." For example, these compensation levels may include the following four different categories ranging from the relative lowest compensation packages of all agents to the relative highest compensation packages of all agents in the organization: learning, successful, successful+, and role model. At step 503, an agent's current compensation level can be set to one of the defined compensation levels. After the agent's compensation level has been defined, the operation flow passes to a second define operation 504.

The second define operation 504 establishes one or more performance metrics for the agent. The performance metrics may relate to any number of performance-based considerations such as, without limitation, call resolution statistics, customer satisfaction statistics, revenue statistics, attrition statistics, call reduction statistics and quality assessment statistics. In an embodiment, performance levels are defined (as described above in FIG. 2 step 204) and achievement values corresponding to each performance level are also defined (FIG. 2 step 206). In a further embodiment, each compensation level may have different amounts of possible variable pay that may be received for reaching the achievement values. As such, two agents at different compensation levels may have the exact same responsibilities but would have differing possible variable pay amounts. With that said, an embodiment of the present invention involves setting an agent's possible variable pay level based on the compensation level within which the agent's current compensation level is categorized.

After the one or more performance metrics have been defined for the agent, the operation flow passes to a collect operation 506 as the agent begins working for the organization and accomplishing tasks.

The collect operation 506 collects actual performance statistics associated with the accomplishment of tasks by the agent. For example, if the agent is a customer service agent, the collect operation 506 may collect information embodying the number of calls that the agent disposes without the assistance of any other agents (i.e., first call resolution and call reduction). Collecting the performance statistic at step 506 also involves generating an agent performance with respect to the metrics. That is, for each metric an agent performance (or value) with respect to that metric is generated at step 506. In an embodiment, the operation flow is maintained at the collect operation 506 and performance statistics are collected until a request is made by an agent, his or her team leader or management to monitor performance of that agent or his/her team, at which time, the operation flow passes to an analysis operation 508. Alternatively, the collect operation 506 may perform statistics collection for a predetermined period of time (e.g., daily), the conclusion of which passes the operation flow to the analysis operation 508.

Regardless of the implementation, the operation flow passes from the collect operation 506 to the compare operation 508, which compares the agent performance against the achievement values from step 504 to determine the relative extent to which the agent is performing for the metrics set by the define operation 504. With that said, an embodiment of the present invention involves ranking the agent's performance into one of four performance categories, or "performance levels:" below threshold, threshold, target and stretch. After the agent's performance has been ranked and categorized into one of the four "performance levels," the operation flow passes to an evaluate operation 510.

The evaluate operation 510 involves integrating and analyzing the agent's performance with the specified financial considerations, which may include any one or more of the following: compensation level including the agent's base pay, the agent's variable pay (e.g., bonuses, in-kind compensation, stock options, etc.) or expected variable pay, a combination of both or the agent's entire compensation package, as defined in the first define operation 503. For exemplary purposes, the optimization process 500 is described herein with the evaluate operation 510 integrating the agent's performance with his or her compensation package. That is, the evaluate operation 510 creates a representation in memory (e.g., on the server computer 108) of how the agent's performance compares with his or her compensation package for analysis as to the relative expected performance of the agent. From the evaluate operation 510, the operation flow passes to a display operation 512.

The display operation 512 renders the integrated information created by the merge operation 510 in a manner for display on a browser or other application of one of the client computers 102, 104 and 105. In an embodiment, such rendering involves creating and displaying a graphical representation comparing or otherwise relating the performance results to financial considerations specifically associated with the agent. Accordingly, the display operation 512 displays the results of the agent's performance in combination with these specific financial considerations. In an embodiment, as noted above, these financial considerations preferably embody the agent's compensation level. In accordance with this embodiment, the graphical representation embodying a table having columns representing the different compensation buckets and rows representing the different performance buckets, as shown below in an example in Table 2:

TABLE 2

| | Learning | Successful | Successful+ | Role Model |
|---|---|---|---|---|
| Stretch | | | | |
| Target | | | | |
| Threshold | | | | |
| Below Threshold | | | | |

Such a table allows for the agent's performance results to be compared against his or her compensation level in a meaningful manner for review by the agent, his or her team leader or management. Indeed, while Table 2 is described as presenting performance versus financial information for only a single agent in order to illustrate the optimization process 500 of FIG. 6, embodiments of the present invention involve using such an integration presentation technique to display information for a collective set of agents (i.e., a "team) or the organization as a whole. With respect to the former, the display operation 512 renders a graphical representation comparing or otherwise relating the performance results of an entire team of agents to financial considerations specifically associated with the team (e.g., the collective compensation package of the team). With respect to the latter, the display operation 512 renders a graphical representation comparing or otherwise relating the performance results of an entire organization (e.g., a plurality of teams) to financial considerations specifically associated with the organization (e.g., the collective compensation package of the organization). Accordingly, Table 2 is applicable for display through not only the agent interface 116, but also the team leader interface 118 (to display performance versus financial information for individual agents and teams as a whole) and the management interface 120 (to display performance versus financial information for individual agents, individual teams and the organization as a whole). From the display operation 512, the operation flow concludes at the terminate operation 514.

Figure 7:
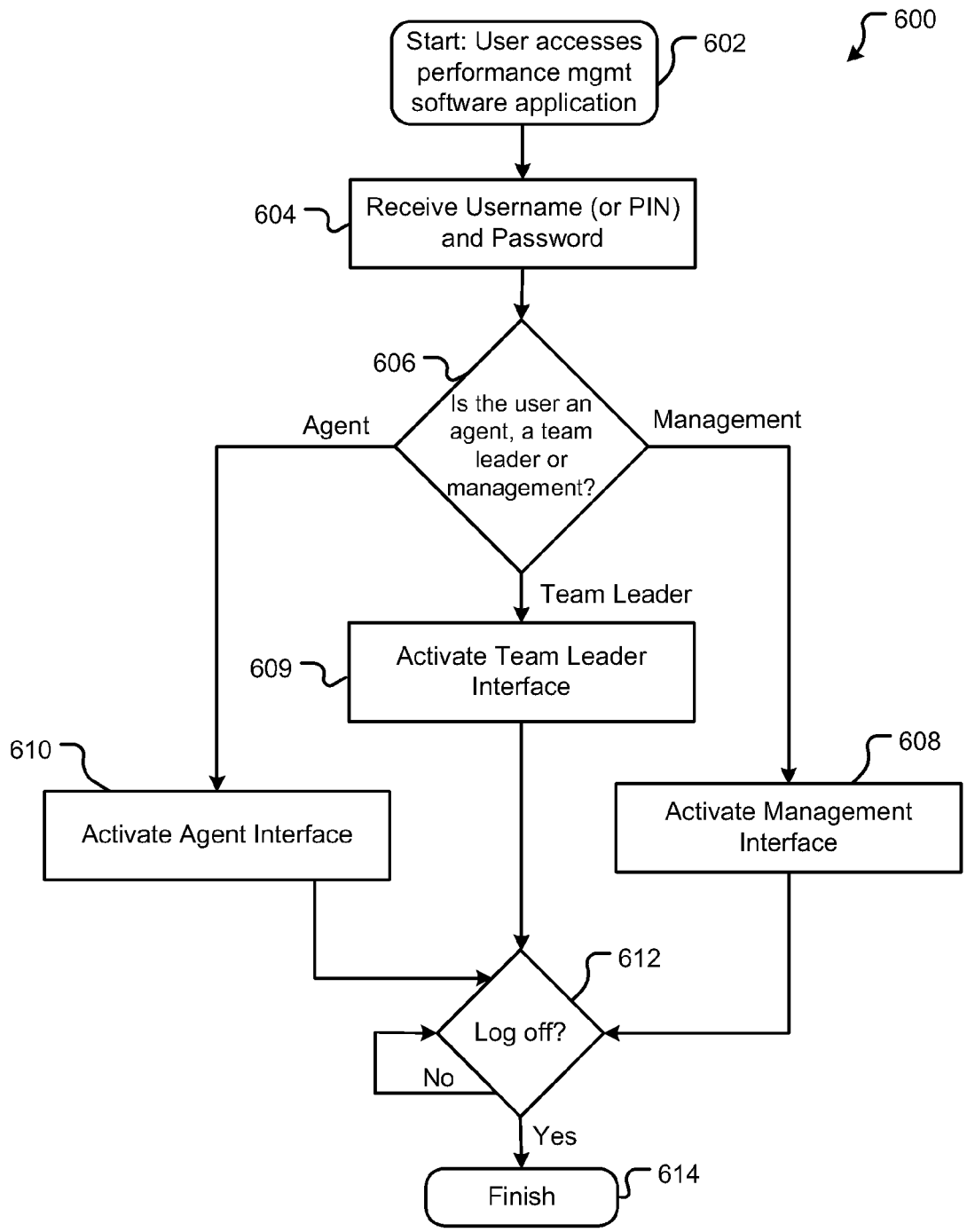
FIG. 7 is a flow diagram illustrating operational characteristics performed by the performance optimization software application shown in FIGS. 3 and 4 to render display of interfaces to users of the software application in accordance with an embodiment of the present invention.

Turning now to FIG. 7, a process 600 for rendering display of an appropriate interface (e.g., 116, 118 or 120) for a user of the performance optimization software 110 is shown in accordance with an embodiment of the present invention. The rendering process 600, which embodies the display operation 512 shown in FIG. 6, is described in an exemplary embodiment as being performed by the server computer 108 to render a performance optimization website on a browser application. For illustration purposes, the browser application is described herein as being implemented on one of the client computers 102, 104 and 105 communicatively connected to the server computer 108 via the network 106. However, in accordance with an alternative embodiment, the browser application may be implemented on a client computer or other user terminal locally connected to the server computer 108 by way of the intranet 112. Such an embodiment is particularly useful in circumstances wherein a team leader or management is accessing the performance optimization software 110 from client computer located on-site with the server computer 108 (e.g., an organization's campus). Regardless of implementation, the process 600 is performed using an operation flow that begins with a start operation 602 and ends with a finish operation 614.

The start operation 602 is initiated in response to a user requesting access to the performance optimization application 110 through one of the client computers 102, 104 or 105. Accordingly, the start operation 602 is triggered in response to the user entering the URL of the performance optimization application 110 into the browser application, which then through conventional networking technology, directs the request to the server computer 108. In response, the performance optimization website is rendered in the browser application and available for use by the user. The performance optimization website provides access to the three different interfaces 116, 118 and 120, which, as described above, are each associated with a different level of authorized access based on user type (i.e., agent, team leader, management). That is, each agent is only authorized to access the agent interface 116 and, more particularly, only to their performance information. In contrast, team leaders are authorized to access team leader interface 118, which provides access to performance information associated with their team as well as performance information for all agents on their team. In an embodiment, the latter form of information (i.e., information specific to all agents that report to a team leader) is made available to team leaders by way of the agent interface 116, which is through the team leader interface 118. In further contrast, management for an organization is authorized to access management interface 120, which provides performance information associated with the organization as a whole as well as performance information for each individual team and agent. Again, to accomplish the latter, the team leader interface 118 and the agent interface 116 are both accessible to management through the management interface 120. Because of these different authorization levels, the initially-rendered webpage, or "homepage," of the performance management web site includes a user interface region (i.e., "logon component") in which authorized users, e.g., agents, team leaders and management, may enter a unique identification name (e.g., PIN) and a password to access their private and personalized specific information.

After the performance optimization website has been rendered in the user's browser application, the operation flow of the management process 600 passes to a receive operation 604. The receive operation 604 is triggered in response to the user submitting a valid PIN and corresponding password to the performance optimization application 110 via the logon component. In receipt of such authorizing information, the operation flow passes to a first query operation 606. The first query operation 606 determines whether the user is an agent, a team leader or management. In an embodiment, such a determination involves consideration of the PIN, which either in memory of the server computer 108 or in the database 114, is linked to a designator of the user type assigned the PIN.

If the first query operation 606 determines that the user is management, the operation flow is passed to a first activate operation 608, which activates the management interface 120 to render web pages specifically intended for management, as described above. If the first query operation 606 determines that the user is a team leader, the operation flow is passed to a second activate operation 609, which activates the team leader interface 118 to render web pages specifically intended to relate to team leaders, as described above. If the first query operation 606 determines that the user is an agent, the operation flow is passed to a third activate operation 610, which activates the agent interface 116 to render web pages specifically intended to relate to agents, also as described above.

After the appropriate interface (116, 118, 120 or 150) of the performance optimization application 110 has been activated, the operation flow passes to a second query operation 612. The second query operation 612 detects whether the user has logged off of the performance optimization website and, if so, passes the operation flow to the finish operation 614, which terminates, or closes, the activated interface (116, 118, 120, or 150). Otherwise, the operation flow is maintained at the second query operation 612, which is continuously practiced until the user logs off of the performance optimization website.

Figure 8:
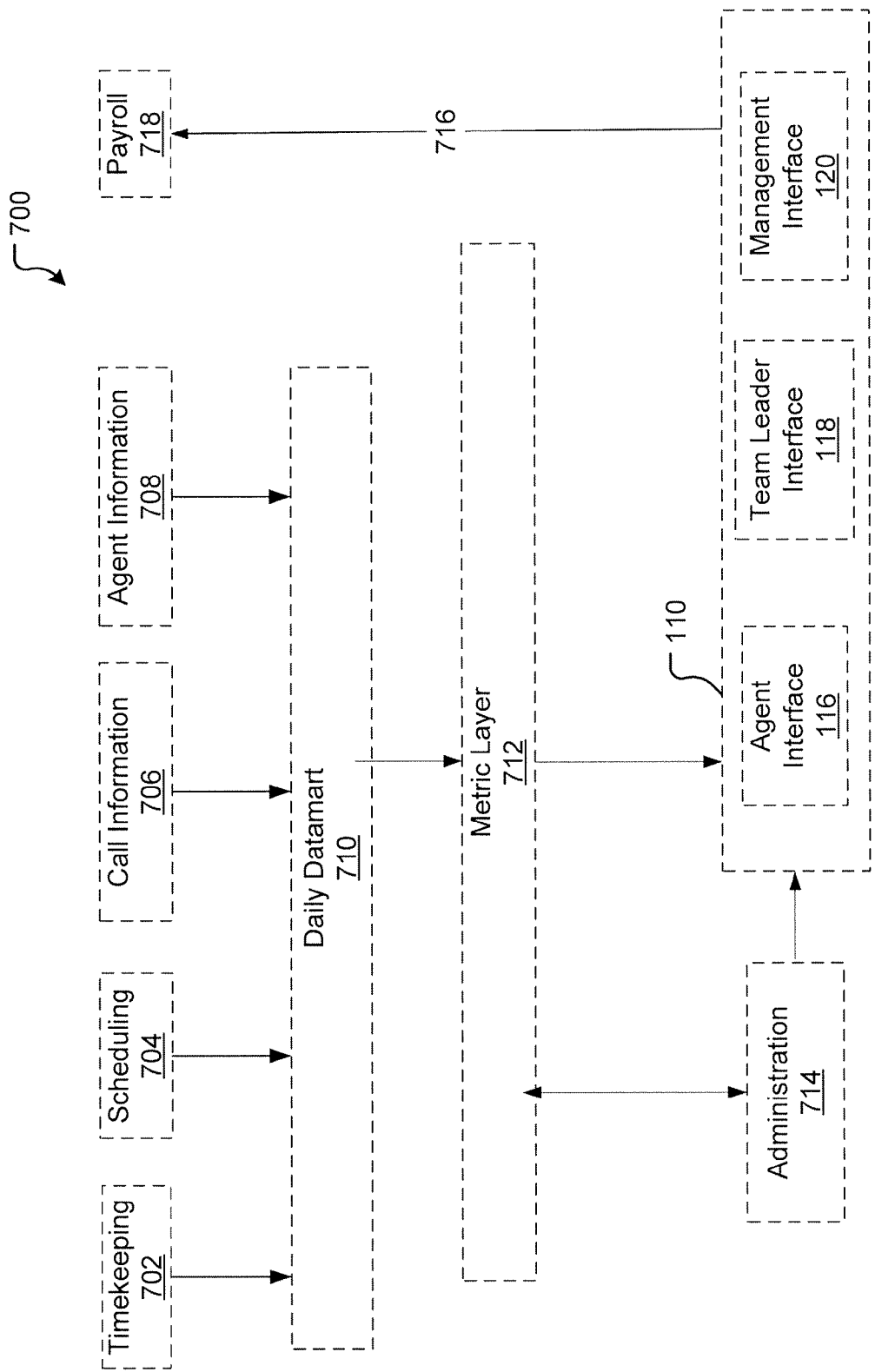
FIG. 8 generally illustrates in block diagram format an embodiment of a system that implements the business model shown in FIG. 1 and the software application shown in FIGS. 3 and 4.
Figure 9:
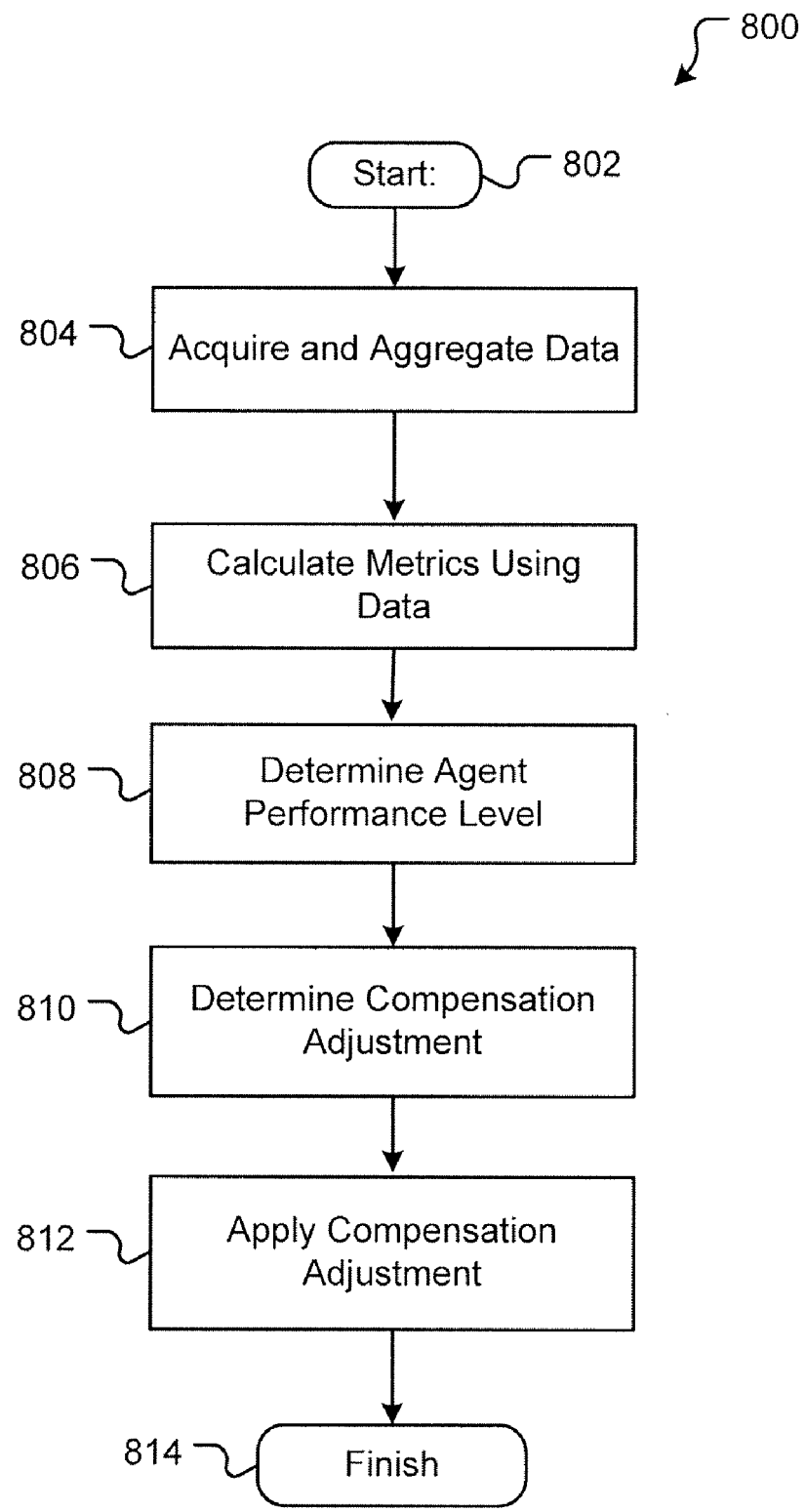
FIG. 9 is a flow diagram illustrating operational characteristics of a process for collecting data, calculating achievement and adjusting compensation in accordance with an embodiment of the present invention.

Attention is now turned to FIGS. 8 and 9, which further illustrate combined implementation of the PO business model 180 and the performance optimization software application 110 in accordance with an embodiment of the present invention and, thus, further depict the unique combination of performance optimization and rewards with enabling technology provided by embodiments of the present invention. FIGS. 8 and 9 illustrate that the performance optimization software application 110 is designed to enable and automate the PO business model 180, the combination of which involves data acquisition and aggregation, administration, performance calculation, agent review, supervisor review and compensation adjustments, as described in more detail below.

Shown in FIG. 8 is a block diagram of a software environment 700 that implements PO business model 180 and the performance optimization software application 110, according to an embodiment of the present invention. Environment 700 includes a number of applications 702, 704, 706 and 708, which collects or maintains information that is relevant to performance of an agent (explained in greater detail below). Additionally, a datamart application 710 acquires and aggregates collected data from applications 702, 704, 706, and 708 on a daily basis. The collected data acquired by datamart application 710 is used by a metric layer 712 to calculate metrics. System 700 also includes an administration application 714 that is used to predefine the metrics calculated by metric layer 712, and predefine performance/pay criteria, which may be referred to in commerce and herein as paysets, to evaluate agent performance. Application 714 also includes administrator interface 150 described above with respect to FIG. 4. PO application 110 will use the metrics calculated by metrics layer 712 and the predefined performance/pay criteria to evaluate agent performance and provide compensation adjustments 716 to payroll application 718, if warranted.

In environment 700, the sources of agent data 702, 704, 706, 708, and 709 are intended to generally illustrate systems (e.g., hardware, software application etc.) that contain information that is relevant to evaluating the performance of an agent. Although described below specifically with respect to a customer service representative agent, in other embodiments, sources 702, 704, 706, 708, and 709 will collect data that is relevant to the tasks performed by the specific agents whose performance is being managed. Moreover, although sources 702, 704, 706, 708 are described as individual applications they may in other embodiments include several applications and/or include a number of different modules as well as hardware for implementing the applications or modules.

Application 702 is a timekeeping software application that maintains the hours worked by individual agents. For example, an agent may use application 702 to clock in when beginning work for the day, and clock out when the work day is over. Scheduling application 704 may include information that indicates the particular schedule that an agent is assigned and expected to work, such as the day of the week with the specific hours of the day. Application 706, in embodiments, is an application that maintains and generates information about specific calls that are handled by agents. Some examples of information that application 706 collects include call times, number of calls handled, and quality assurance information for calls. In other embodiments, application 708 may collect or maintain other data relevant to evaluating an agent's performance. Agent information may be maintained and generated by application 710. Agent information may include for example identifying information for agents employed by an organization. As can be appreciated, applications 702, 704, 706 and 708 all collect or maintain information that is useful in evaluating an agent.

Daily datamart 710 acquires, aggregates, and stores collected data from applications 702, 704, 706 and 708, on a daily basis. The data is merely received and aggregated from applications 702, 704, 706 and 708. Although as is appreciated by those with skill in the art, acquiring and aggregating data from applications 702, 704, 706 and 708 may involve a number of ETL (extract, transform, load) processes.

The administration application 714 is used to predefine metrics that will be used to evaluate agents. As described above, some examples of metrics include call resolution, customer satisfaction, revenue generation, attrition, call reduction and quality assessment. Administration application 714 is used to define the metrics as a function of the collected data acquired and aggregated in daily datamart 710. For example, using administration application 714, an average call handle time metric may be defined as a function of: total call time divided and total number of calls for an individual agent. This is merely one example, and any metric useful in evaluating an agent can be defined using administrative application 714 as a function of the collected data.

The metrics layer 712 uses the collected data to calculate agent metrics according to the predefined metrics. As described above, the metrics are predefined using administration application 714. The metrics layer 712 may include one or more applications that take as input the collected data from daily datamart 710 and calculates agent metrics according to the metrics predefined using the administration application. The metrics layer 712 provides the calculated metrics to the PO application 110.

Referring again to administrative application 714, it is also used to establish paysets. A payset includes key performance indicators defined in terms of levels combined with metrics. In order for an agent to achieve a specific level, he/she must meet or exceed the achievement level for all metrics. For example, in an embodiment, there may be four performance levels: below threshold, threshold, target and stretch. To be ranked within a performance level, an agent must achieve or exceed the specific achievement level for all metrics defined in the payset. For example, in one embodiment, average call handle time may be defined as a metric. In this embodiment, to achieve the stretch level an agent must have an average handle time less than 330 seconds (achievement). While to meet the target level, an agent may only need to have an average call time of less than 390 seconds (achievement). The award opportunity levels are also defined in relation to an agent's compensation. If an agent's compensation is relatively higher than other agents, then the award opportunity defined for the agent will also be relatively lower. That is, an agent compensated at a higher level is expected to meet higher achievement levels. If an agent achieves a different level for one or more of the metrics, the agents overall performance will be ranked according to the lowest achieved level for any individual metric.

In addition to performance levels, a payset also defines base pay levels, which in one embodiment may include: learning, successful, successful+, and role model. The pay levels represent the monetary base pay for an agent. For example, in an embodiment, learning represents a lower base pay relative to successful, which represents a lower base pay relative to successful+. As described above, the pay level is used to define achievement values, and is also used in combination with the performance level to evaluate an agent's performance. The combination of performance level and pay level may be embodied in a table such as Table 2, described above. The paysets defined using administration application 714 (the combination of pay level, performance level, and achievement values) are used to evaluate an agent and make adjustments to their compensation. For example, an agent with base pay at a learning pay level who achieves a role model performance level may be eligible for an increase in compensation. Paysets can be defined and applied to a site, client, program, job title, and/or call type.

In one embodiment, administration application 714 may also define pay sets that are designed to account for an organization's concern over profits. As one example, in the customer service industry a client may contract an organization which employs customer service agents to take calls from the client's customers. In this example, the client may pay the organization a set amount of money per agent. The more an agent is paid by the organization, the less the organization will make as profit. Accordingly, the compensation rule may be adapted to reflect this. In one embodiment, an agent must achieve a performance level above a defined performance level, e.g. the threshold performance level, to increase their base pay. However, when their base pay increases, the amount available for variable pay will decrease. For example, an agent may have a base pay of $10.00/hour and the potential for receiving a variable pay amount that is 20% of their base pay. If the agent performs at a high level for a predetermined period of time, their base pay may increase to $11.00/hour, however their potential variable pay may be reduced to only 10% of their base pay. This type of compensation rule still incentivizes agents, because their base pay (i.e., guaranteed money) is increased with better performance, but also takes into consideration the costs/margins of an organization. It is contemplated that other compensation rules may be defined to apply to various situations, and the present invention is not limited to any specific compensation rule.

PO application 110 uses the paysets defined using the administration application 714, and the agent's metrics calculated and provided by the metrics layer 712 to evaluate an agent's performance, determine compensation adjustments 716, and provide access to an agent's performance using interfaces 116, 118, and 120. In one embodiment, the PO application 110 evaluates an agent's performance daily, including a performance evaluation for the day and updated cumulative monthly performances. As described above, the performance results are accessed through interfaces 116, 118, and 120. Accordingly, PO application 110 allows real-time monitoring of an agent's performance on a daily basis.

As shown in FIG. 8, PO application 110 calculates compensation adjustments 716 based on the defined paysets, and transmits the compensation adjustments 716 to payroll application 718, where they are implemented. As will be appreciated, in some embodiments the compensation adjustments 716 may be calculated daily along with agents' performances, but only applied every pay period. Payroll application 718 may be any conventional payroll application that is used to manage the payroll of an organization.

In some embodiments, the compensation adjustments calculated by PO application 110 are made and applied automatically, without any additional input by a manager. In this embodiment, an administrator will, in addition to defining metrics and paysets, also define rules for providing compensation adjustments 716. For example, using the previously discussed base pay levels and performance levels, an administrator may establish a rule that whenever an agent performs at the role model performance level for 5 consecutive days, the agent will automatically receive a bonus (e.g., 2% of their base salary). In this example, when PO application calculates the performance levels for agents, it will automatically apply the rules established by the administrator and provide compensation adjustments 716 accordingly to payroll application 108. In other embodiments, a manager may access PO application 110 using interface 118 or 120 and manually apply compensation adjustments 716 based on viewing performance levels for agents. The compensation adjustments will then be provided to payroll application 718.

FIG. 9 illustrates a process 800 for implementing the PO business model 180 for optimizing the performance of agents, and for generating compensation adjustments to modify compensation of agents based on their performance. As such, the process 800 is operable to evaluate an agent's, team's or entire organization's performance against relative criterion, or metrics, and link such evaluation to financial considerations. The process 800 is described below with reference to only one agent for simplicity purposes; however, it should be appreciated that the process is preferably practiced in numerous instances for each agent in an organization. The process 800 is performed using an operation flow that begins with a start operation 802 and ends with a finish operation 814. The start operation 802 is initiated to begin optimizing the performance of a specific agent in an organization. From the start operation 802, the operation flow initially passes to acquire and aggregate data operation 804.

The acquire and aggregate data operation 804, collects data that is relevant to evaluating the performance of an agent with respect to an organization's strategic goals. The type of data that is acquired and aggregated during operation 804 will depend on the tasks that an agent is performing for the organization. For example, if the agent is a customer service representative, then the data acquired and aggregated during operation 804 may relate to data such as call handling time, quality assessment, number of hours worked, and number of calls handled. However, as will be appreciated, the data may relate to any data relevant to evaluating agents.

After the acquire and aggregate data operation 804, the operation flow passes to calculate metrics 806. The calculate metrics operation 806 uses the data collected from operation 804 to calculate agent's performance metrics. As described above, performance metrics may be predefined along with threshold values. In operation 806, the data acquired during operation 804 is used along with predefined metrics to calculate an agent's metrics, which are then compared to the achievement values to evaluate the performance of an agent (operation 808 described below). For example, in one embodiment a metric may be defined as the average time it takes an agent to handle a call. In this embodiment, the calculate metrics operation 806 uses the data for the number of calls handled by an agent and the total call time of an agent (acquired and aggregated at operation 804) to calculate an average call time for an agent.

The agent's metrics calculated at operation 806 are used in operation 808 to determine/evaluate an agent's performance level. Operation 808 involves comparing the agent metrics, to established achievement values, which are predefined in relation to performance levels and a compensation (e.g., base pay) level of the agent. For example, in an embodiment, there may be four performance levels: below threshold, threshold, target and stretch. To be ranked within a performance level, an agent's metrics must meet achievement values defined for each level. In one embodiment, average call handle time may be defined as a metric. In an embodiment, to achieve the stretch level an agent must have an average handle time less than 330 seconds (achievement). In some embodiments, if an agent achieves a different level for one or more metrics, the agents overall performance will be ranked according to the lowest achieved level for any individual metric.

Process flow passes to operation 810 where the performance level is used to determine compensation adjustments. The compensation adjustments may be determined using any method that uses the performance level from operation 808. In one embodiment, the performance level is analyzed in combination with a compensation (e.g., base pay level) to determine the compensation adjustments for an agent. One implementation of this embodiment was discussed above with respect to Table 2. As described above, the performance level is evaluated relative to an agent's base pay level and determinations are made whether the agent's performance level warrants an increase or decrease in compensation. In one embodiment, operation 810 may involve determining whether and agent's performance has remained at a predetermined level for a number of months. As one example, if an agent has maintained a relatively high level of performance for three months, (as determined by comparing the performance level to a current base pay level) the agent may warrant an increase in base pay. On the other hand, if an agent has maintained a relatively low level of performance for three months, (as determined by comparing the performance level to a current base pay level) the agent may warrant a decrease in base pay.

At operation 812, the compensation adjustments determined from operation 810 are applied. In some embodiments, the compensation adjustments involve variable pay such as bonuses. In other embodiments, the compensation adjustments may involve changes (increase or decrease) to base pay.

Having described the embodiments and various advantages of the present invention with reference to the figures above, it should be appreciated that numerous modifications may be made to the present invention that will readily suggest themselves to those skilled in the art and which are encompassed in the spirit of the invention disclosed and as defined in the appended claims. Indeed, while a presently preferred embodiment has been described for purposes of this disclosure, various changes and modifications may be made which are well within the scope of the present invention.

What is claimed is:

1. A non-transitory computer readable storage medium for storing instructions that, when executed by a processor, cause the processor to perform a method for displaying performance information to an agent, the method comprising the steps of:
receiving information identifying the agent by the processor;
in response to the receiving, retrieving performance information for the agent stored in a storage device, the performance information comprising:
an agent performance level for a predefined performance metric, wherein the agent performance level is one of a plurality of performance levels and is determined by comparing an agent performance with a plurality of achievement values, each achievement value associated with one of the plurality of performance levels, wherein the plurality of performance levels comprises a first performance level and each additional performance level represents a higher performance level than the previous performance level; and
a payset defining a plurality of base pay levels;
in response to instructions from the processor, displaying on a display device a graphical representation to the agent, the graphical representation comprising the agent performance level in combination with the plurality of base pay levels; and
automatically applying by the processor a calculated compensation adjustment to a current compensation level provided to the agent based on the agent performance level, one of the plurality of base pay levels, and a compensation rule stored in the storage device, wherein the compensation rule indicates a first period of time over which an agent must achieve one of the plurality of performance levels to change the current compensation level provided to the agent, and a second period of time over which an agent must achieve a higher one of the plurality of performance levels to change the current compensation level provided to the agent.

2. The non-transitory computer readable storage medium of claim 1, wherein the graphical representation comprises a representation of each of the plurality of performance levels and an indication of which one of the plurality of performance levels corresponds to the agent performance level.

3. The non-transitory computer readable storage medium of claim 2, wherein the plurality of performance levels correspond to a variable pay amount, the variable pay amount being defined as a percentage of a base pay.

4. The non-transitory computer readable storage medium of claim 3, wherein the graphical representation further comprises an indication of the variable pay amount for each of the plurality of performance levels.

5. The non-transitory computer readable storage medium of claim 1, wherein the graphical representation relates the agent performance level to a period of time over which the agent achieved the agent performance level.

6. The non-transitory computer readable storage medium of claim 3, wherein the period of time is a day.

7. The non-transitory computer readable storage medium of claim 4, wherein the graphical representation comprises a representation of a plurality of days and an indication of the agent performance level for each of the plurality of days.

8. A non-transitory computer readable storage medium for storing instructions that, when executed by a processor, cause the processor to perform a method for displaying performance information for a plurality of agents in a first group and a plurality of agents in a second group, the method comprising the steps of:
receiving information identifying the plurality of agents in the first and second groups by the processor;
in response to the receiving, retrieving performance information for the plurality of agents in the first and second groups stored in a storage device, the performance information comprising:
for each of the plurality of agents in the first and second groups, an agent performance level with respect to predefined performance metrics enabling a normalized basis of comparison of the plurality of agents in the first group to the plurality of agents in the second group for performing different tasks, wherein the agent performance level is one of a plurality of performance levels applicable to the plurality of metrics and is determined by comparing an agent performance with a plurality of achievement values specific to a single metric, each achievement value associated with one of the plurality of performance levels, wherein the plurality of performance levels comprises a first performance level and each additional performance level represents a higher performance level than the previous performance level; and
for each of the plurality of performance levels, determining by the processor a number of agents in the first and second groups that have an agent performance level corresponding to the performance level;

in response to instructions from the processor, displaying on a display device a graphical representation of the plurality of performance levels and an indication of the number of agents in the first and second groups that have an agent performance level corresponding to the performance level; and automatically applying by the processor a calculated compensation adjustment to a current compensation level provided to the number of agents in the first and second groups based on the agent performance level and a compensation rule stored in the storage device, wherein the compensation rule indicates a first period of time over which the number of agents must achieve one of the plurality of performance levels to change the current compensation level provided to the number of agents, and a second period of time over which the number of agents must achieve a higher one of the plurality of performance levels to change the current compensation level provided to the number of agents.

9. The non-transitory computer readable storage medium of claim 8, wherein the plurality of performance levels correspond to a variable pay amount, the variable pay amount being defined as a percentage of a base pay.

10. The non-transitory computer readable storage medium of claim 8, wherein the performance information further comprises an agent compensation level for each of the plurality of agents in the first and second groups, and the graphical representation comprises a chart that relates the plurality of performance levels to the plurality of compensation levels.

11. A non-transitory computer readable storage medium for storing instructions that, when executed by a processor, cause the processor to perform a method for monitoring the performance of an agent and modifying compensation of the agent based on the performance of the agent, the method comprising the steps of:

receiving information by the processor, the information:

defining a metric for evaluating the performance of an agent;

defining a plurality of performance levels;

establishing a plurality of achievement values for the performance metric, wherein each of the plurality of achievement values corresponds to one of the plurality of performance levels;

defining a plurality of compensation levels, wherein the agent is compensated at one of the plurality of the compensation levels, wherein the plurality of performance levels comprises a first performance level and each additional performance level represents a higher performance level than the previous performance level; and defining a compensation rule indicating a first period of time over which an agent must achieve one of the plurality of performance levels to change a current compensation level provided to the agent, and a second period of time over which an agent must achieve a higher one of the plurality of performance levels to change the current compensation level provided to the agent;

collecting performance statistics for the agent with respect to the metric;

storing in a storage device the performance statistics;

determining by the processor an agent performance;

comparing by the processor the agent performance to the achievement values to determine an agent performance level, wherein the agent performance level is one of the plurality of performance levels;

determining automatically by the processor whether to provide a compensation adjustment based on the agent performance level and the compensation rule;

in response to instructions from the processor, displaying on a display device an indication of the compensation adjustment; and adjusting the achievement values based upon at least one of the experience of the agent or the agent performance.

12. The non-transitory computer readable storage medium of claim 11 further comprising the step of:

sending an indication of the compensation adjustment to a payroll application.

13. The non-transitory computer readable storage medium of claim 11, wherein each of the plurality of compensation levels define a combination of base pay and variable pay, the variable pay being defined as a percentage of base pay.

14. The non-transitory computer readable storage medium of claim 13, wherein the plurality of compensation levels comprise a first compensation level and a second compensation level, the first compensation level being higher than the second compensation level.

15. The non-transitory computer readable storage medium of claim 13, wherein the first compensation level comprises a higher base pay than the second compensation level, and a percentage defining the variable pay of the first compensation level is lower than a percentage defining the variable pay of the second compensation level.

16. The non-transitory computer readable storage medium of claim 13, wherein the compensation rule defines a first period of time over which an agent must achieve one of the plurality of performance levels to receive the variable pay.

17. The non-transitory computer readable storage medium of claim 11, wherein the information further comprises information for: defining a second metric for evaluating the performance of the agent, and establishing a second plurality of achievement values for the second performance metric, wherein each of the second plurality of achievement values corresponds to one of the plurality of performance levels, the method further comprising:

collecting second performance statistics for the agent with respect to the second metric to determine a second agent performance;

comparing the second agent performance to the second plurality of achievement values to determine a second agent performance level, wherein the second agent performance level is one of the plurality of performance levels, wherein the second agent performance level is a different one of the plurality of performance levels; and utilizing the compensation rule based on the lower of the second agent performance level and the first agent performance level.

18. The non-transitory computer readable storage medium of claim 11 wherein the displaying step further comprises:

rendering on a computer display screen a graphical representation relating the plurality of performance levels to the plurality of compensation levels, wherein the graphical representation comprises an indication of the current compensation level and the agent performance level.

* * * * *